US005492588A

United States Patent [19]

Weder et al.

[11] Patent Number: 5,492,588

[45] Date of Patent: Feb. 20, 1996

[54] METHOD FOR FORMING SLEEVES

[75] Inventors: Donald E. Weder, Highland, Ill.; Frank Craig, Valley Park, Mo.

[73] Assignee: Highland Supply Corporation, Highland, Ill.

[21] Appl. No.: 219,221

[22] Filed: Mar. 28, 1994

[51] Int. Cl.$^6$ .......................... B32B 31/08; B32B 31/18; B65B 43/06

[52] U.S. Cl. .......................... 156/251; 156/201; 156/290; 156/292; 156/308.4; 156/324; 156/515; 493/296; 53/455; 53/452; 53/399

[58] Field of Search .................................... 156/201, 290, 156/251, 292, 308.4, 324, 461, 515, 543; 493/194, 196, 287, 295, 296; 53/451, 455, 452, 399; 383/907; 220/678; 206/423; 47/72; 229/87.01

[56] References Cited

U.S. PATENT DOCUMENTS 3,468,096 9/1969 Franz .................................. 156/290 X
4,229,928 10/1980 Münchinger .............................. 53/452
4,425,174 1/1984 McLoughlin ........................ 156/290 X
4,512,136 4/1985 Christine .............................. 53/455 X
4,825,915 5/1989 Hess et al. ............................. 493/287

FOREIGN PATENT DOCUMENTS 2927497 1/1981 Germany .............................. 493/196

*Primary Examiner*—Michele K. Yoder
*Attorney, Agent, or Firm*—Dunlap & Codding

[57] ABSTRACT

A sleeve forming method and apparatus where sleeves are formed by use of overlapping webs. The webs are twisted in one direction to form a seal at one side of a sleeve and later twisted in the opposite direction to form the seal at the opposite side of a sleeve, such that all of the sleeves are oriented in the same direction, such as with the large openings of the sleeves facing upwardly and the smaller openings of the sleeves facing downwardly.

5 Claims, 6 Drawing Sheets

METHOD FOR FORMING SLEEVES

FIELD OF THE INVENTION

This invention relates to improvements in methods and apparatuses for forming sleeves, such as used in the floral industry.

BACKGROUND OF THE INVENTION

Sleeves for potted plants are typically formed using two mating webs, with the final web advance being made by a feed blade which always remains in between the two webs and just upstream of the point at which the webs are sealed together. After two webs are sealed together, the blade strokes forward to advance the web and then retracts before the next seal cycle. With this typical method, the webs remain in the same plane throughout the operation and seals are made across the web at acute angles to form sleeves which are open at both ends, with one end being larger than the other end.

With the typical prior technique, the large opening of each sleeve is adjacent to the small opening of the adjacent sleeve. In those cases where the webs are run on edge, one half of the sleeves would have a large opening up and half of the sleeves would be upside down. This requires further manipulation of half of the sleeves in order for the sleeves to be filled with potted plants being moved in the same direction, such as vertically.

SUMMARY OF THE INVENTION

The present invention employs a feed blade which not only advances the webs, but, in one embodiment, rotates to twist the webs clockwise ninety degrees on one feed cycle and rotates to twist the webs counter clockwise ninety degrees on the next feed cycle. In another embodiment, the feed blade is retracted after advancing the webs and the webs are twisted in the desired direction by another mechanism. In either embodiment, the large opening of each sleeve is, for example, "up"; simplifying the insertion of the potted plants into the sleeves.

DETAILED DESCRIPTION OF THE PREFERRED EMBODIMENTS

Figure 1A:
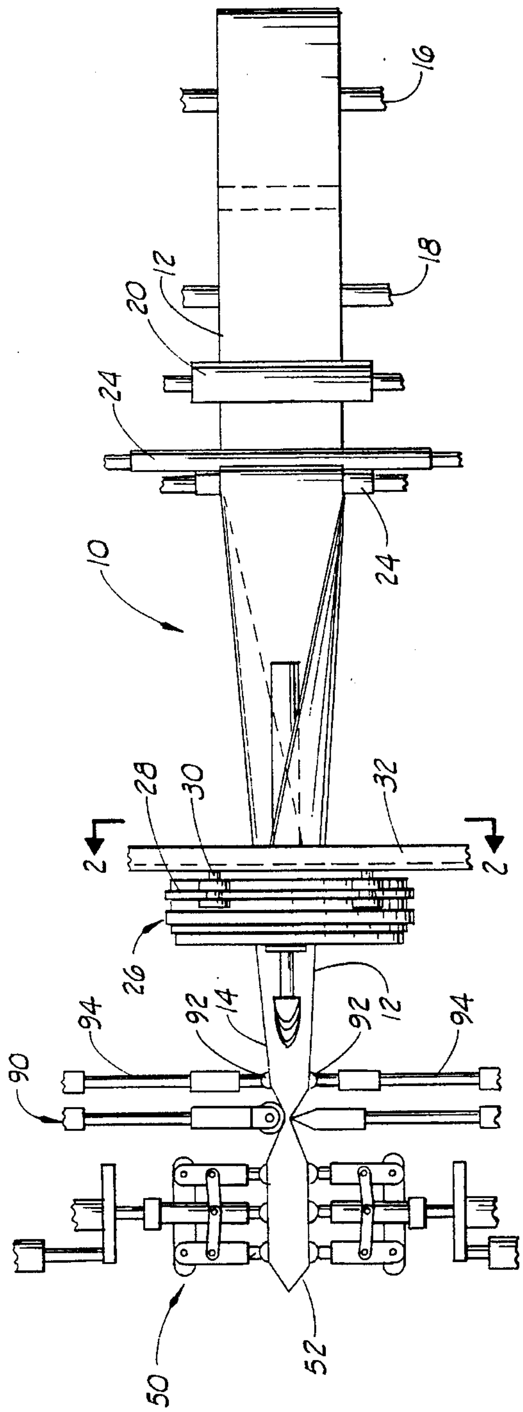
FIG. 1A is a schematic top view of the operating components of an apparatus constructed according to this invention illustrating the apparatus in a position where a sleeve is being formed.

Referring to the drawings in detail, and particularly FIGS. 1–4, reference character 10 generally designates an apparatus for forming sleeves using a pair of webs 12 and 14. The webs 12 and 14 are usually of the same material and have equal widths. Normally, the webs 12 and 14 are supplied on separate unwind rolls 16 and 18, although the two webs could be supplied on a single unwind roll where the webs are placed on the one unwind roll in overlapping relation.

A pair of nip rolls 20 are driven in any suitable manner to unwind the webs 12 and 14 from the supply rolls 16 and 18, with the webs being in overlapping relation. A commonly used dancer roller 22 takes up the slack in the webs between the driven nip rolls 20 and idler nip rolls 24 in the usual fashion.

Figure 2:
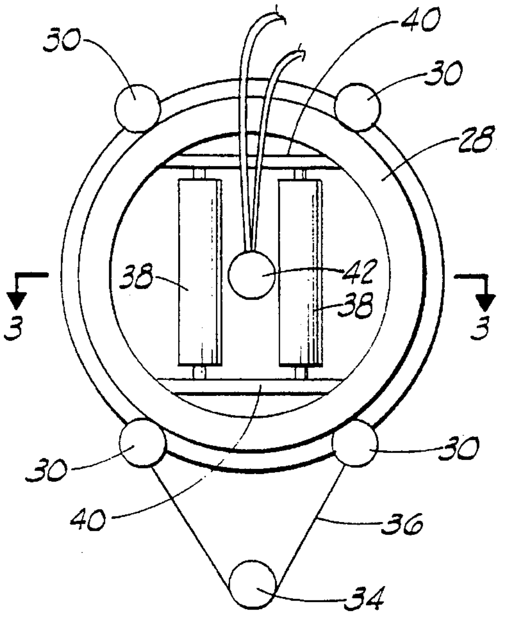
FIG. 2 is a schematic cross-sectional view taken along line 2—2 of FIG. 1.

The webs 12 and 14 are fed through a rotator assembly generally designated by reference character 26. The rotator assembly 26 basically comprises a ring 28 supported by a plurality of rollers 30 journaled in crossbeams 32 forming a part of the frame of the apparatus 10. As shown in FIG. 2, four support rollers 30 are shown. A rotator drive motor 34 is suitably mounted on the frame of the apparatus 10 and drives a belt 36 extending around the ring 28. The drive motor 34 may be of any desired design which can be used to rotate the ring 28 in either direction.

Figure 3:
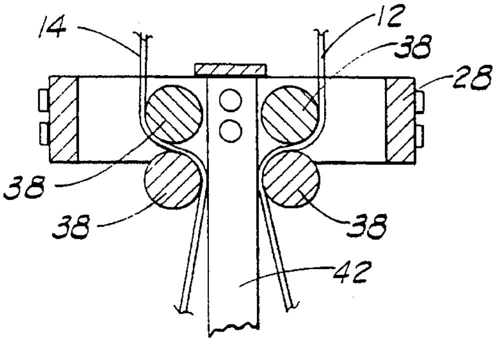
FIG. 3 is a schematic cross-sectional view taken along line 3—3 of FIG. 2.

Four idler nip rolls 38 are journaled to upper and lower platforms 40 secured in the ring 28. The nip rolls 38 are arranged in two pairs; one pair for controlling the web 12 and the other pair for controlling the web 14 in a manner to be described. As shown in FIG. 3, each of the webs 12 and 14 is threaded through the respective pair of nip rolls 38.

A cylinder 42 is suitably secured in the ring 28 in a position to extend through the center of the ring 28 and turn about its own axis upon turning of the ring 28 by the drive motor 34. The piston rod 44 (FIG. 1B) of the cylinder 42 extends from the cylinder 42 in the direction opposite the nip rolls 24.

A feed blade 46 is pivotally secured on the free end of the piston rod 44, such that the angle of the feed blade 46 can be varied with respect to the axis of the piston rod 44. A pneumatic cylinder assembly 48 is secured on the piston rod 44 and has the piston thereof pivotally secured to the feed blade 46 as shown in FIG. 1B, such that upon actuation of the air cylinder assembly 48, the feed blade 46 can be pivoted on the end of the piston rod 44. The pneumatic cylinder assembly 48 thus controls the angle of the feed blade 46 with respect to the axis of the piston rod 44.

A sleeve opener assembly generally designated by reference character 50 is suitably supported on the frame of the apparatus in spaced relationship with respect to the rotator assembly 26 in a downstream direction of the movement of the webs 12 and 14. The web opening assembly 50 is shown enlarged in FIG. 4 in what may be considered an expanded position holding a sleeve 52 in a fully open position for receipt of a potted plant or the like. The sleeve opening assembly 50 comprises identical subassemblies 54 on opposite sides of the sleeve 52. Each subassembly 50 includes a pair of what may be considered outer vacuum cups 56 and a third vacuum cup 58 located centrally with respect to the cups 56.

All of the vacuum cups are operated from suitable sources of vacuum (not shown) connected to a respective cup by conduits 60 in the usual fashion. Each of the outer cups 56 is mounted on an inner end of an arm 62 pivotally connected to a U-shaped mounting bar 64. The centrally located vacuum cup 58 is supported on a rod 66 extending from a cylinder 68, such as a pneumatically powered cylinder. The rod 66 extends through a mating aperture 70 in the central portion of the mounting bar 64. The movement of the rod 66 away from the sleeve 52 is limited by mating shoulders on the rod 66 and a cross bar 72 secured to the member 64. A second crossbar 74 is positioned outwardly of the U-shaped mounting bar 64. A pair of stop members 76 extend from the bar 74 through mating apertures 78 in the bar 64, such that the relative position of the bar 74 with respect to the bar 64 is limited through a desired extent of movement. The movement of the bar 74 is controlled by a piston rod 80 extending from a control cylinder 82 rigidly secured to the frame of the apparatus 10. Coil springs 84 surround the rod 66 inwardly and outwardly of the bar 64 to steady the relative movement of the bars 64 and 74. Additional struts on bars 88 are pinned between the arms 62 and the piston rod 66 for stability of the system.

Figure 4:
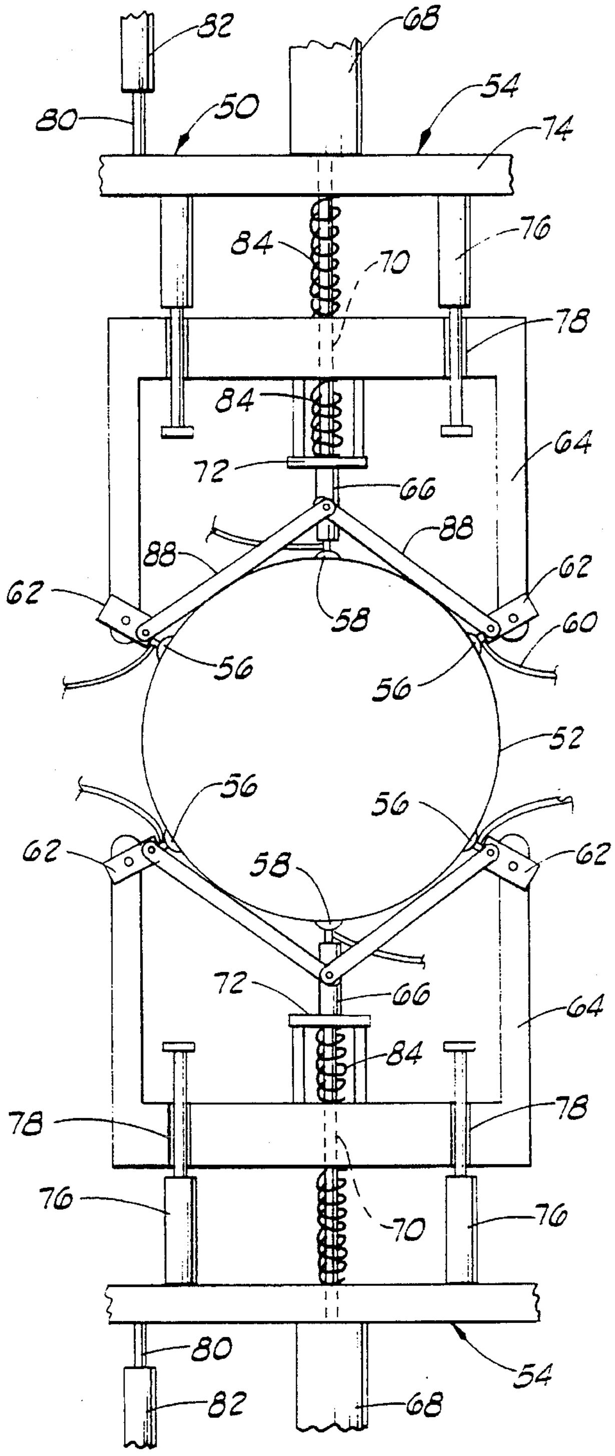
FIG. 4 is a schematic end view of apparatus for opening the sleeves.

As will be observed from an examination of FIG. 4, the degree of extension of the rod 66 from the cylinder 68 controls the relative position of the vacuum cup 58 with respect to the vacuum cups 56, such that all of the vacuum cups can be arranged virtually in a line to engage one side of the material forming the sleeve 52 when the sleeve 52 is collapsed. Operation of the cylinder 68 can retract the rod 66 to arrange the cups 56 and 58 in the position shown in FIG. 4 during expansion of sleeve 52. Also, the cylinder 82 controls the movement of the entire half of the sleeve opening assembly 50 during expansion of the sleeve 52 as will be described further below.

Figure 1B:
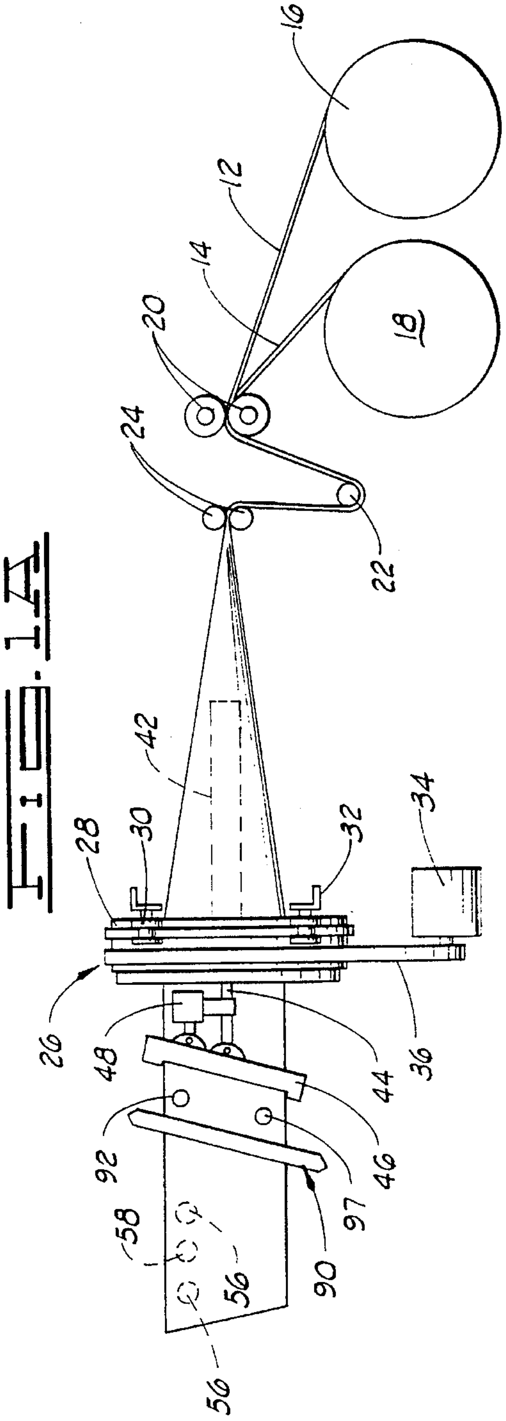
FIG. 1B is a schematic side view of the major portion of the apparatus shown in FIG. 1A.

A conventional hot seal and cut bar assembly 90 is suitably supported from the frame of the apparatus between the sleeve opening assembly 50 and the rotator assembly 26 as shown in FIG. 1A. Additional vacuum cups 92 are mounted on rods 94 in a position adjacent to the hot seal and cut bar assembly 90, but between such hot seal and cut bar assembly and the rotator assembly 26. There are two vacuum cups 92 on each side of the apparatus 10 arranged in vertically offsetting relation as shown by the dashed lines in FIG. 1B. As also shown in FIG. 1B, the hot seal and cut bar assembly extends at an acute angle across the webs 12 and 14 when the webs 12 and 14 are in the positions shown in FIGS. 1A and 1B. For clarity of illustration, one set of the vacuum cups 56 and 58 are shown in dashed lines in FIG. 1B to illustrate the relative positions when a sleeve is being formed.

OPERATION OF EMBODIMENT SHOWN IN FIGS. 1–4

Figure 5A:
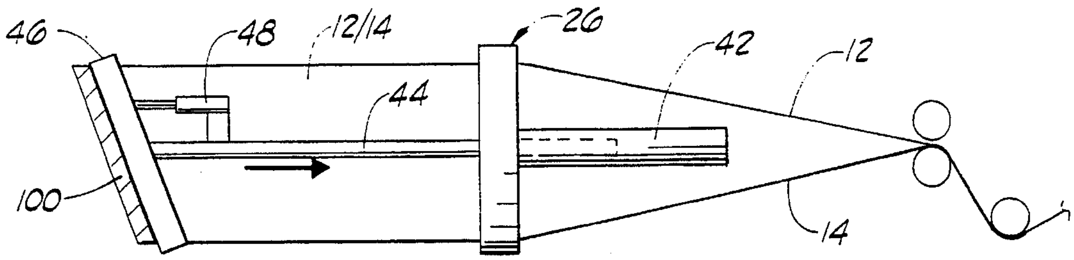
FIGS. 5A–5N are schematic illustrations showing the sequence of operation.
Figure 5B:
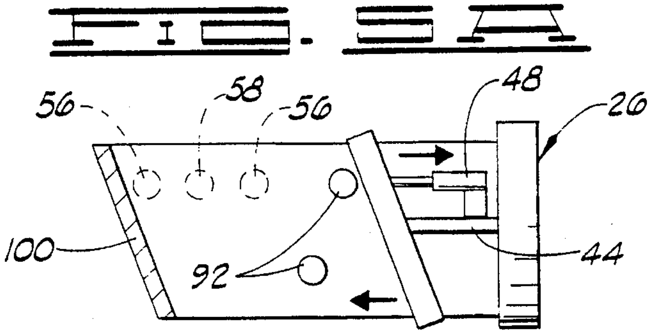
Figure 5C:
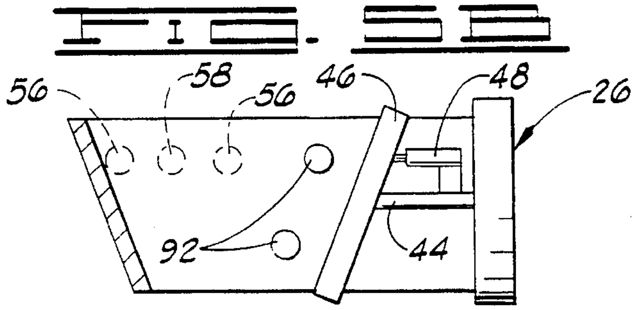
Figure 5D:
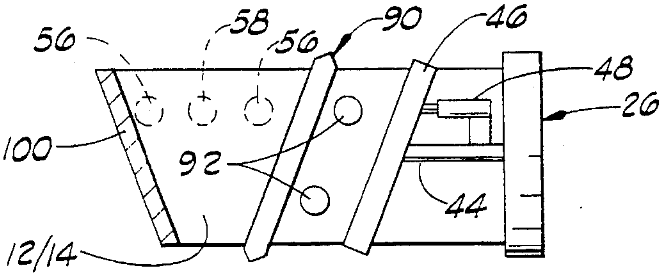
Figure 5E:
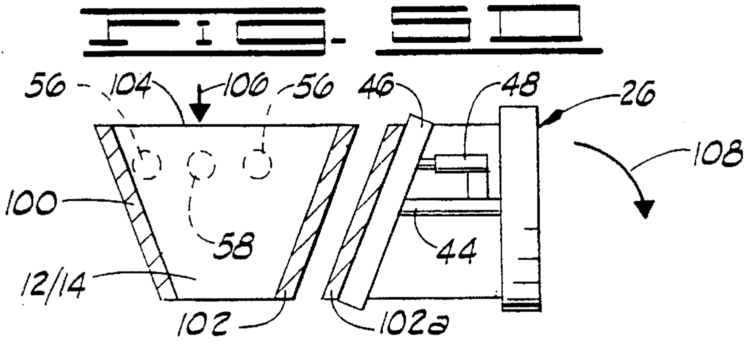
Figure 5F:
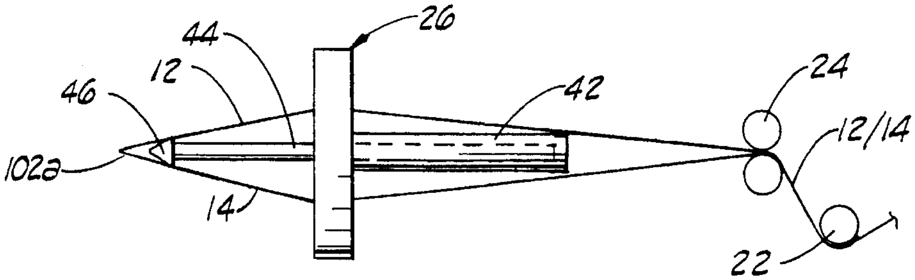
Figure 5G:
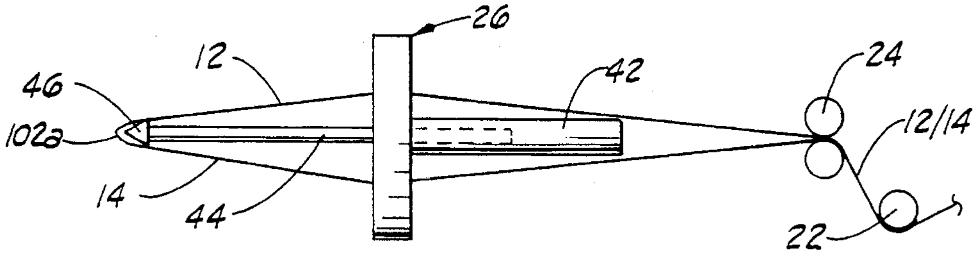
Figure 5H:
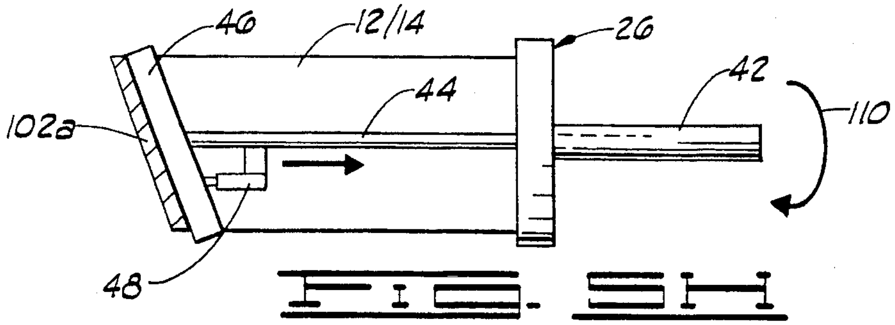
Figure 5I:
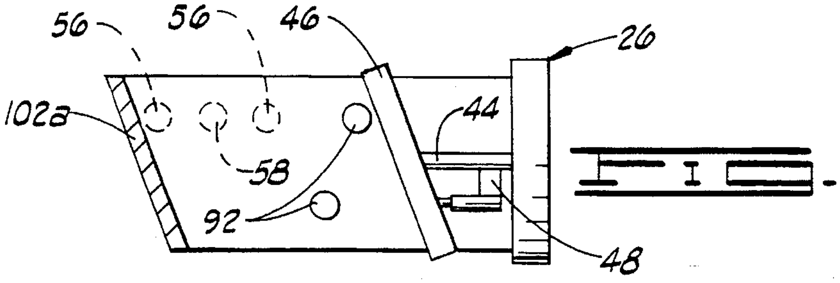
Figure 5J:
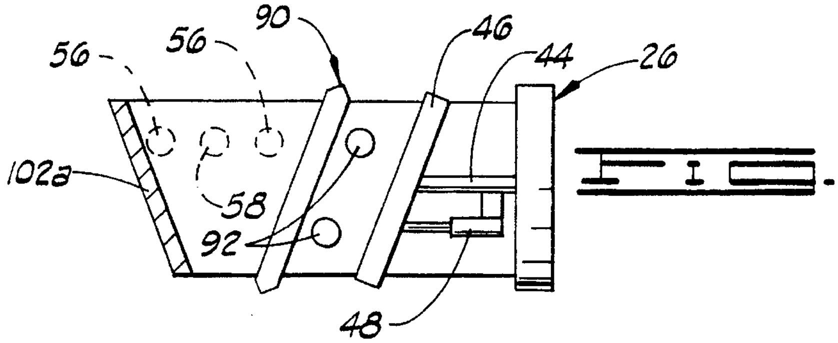
Figure 5K:
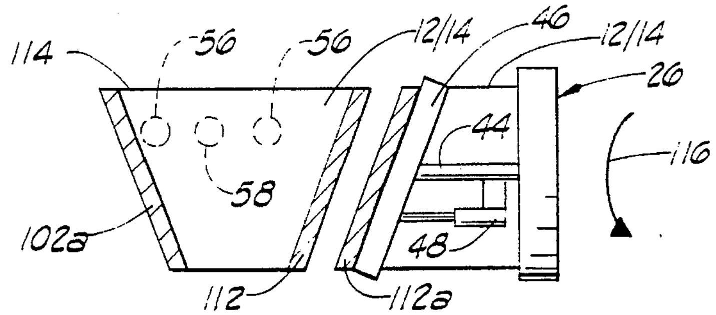
Figure 5L:
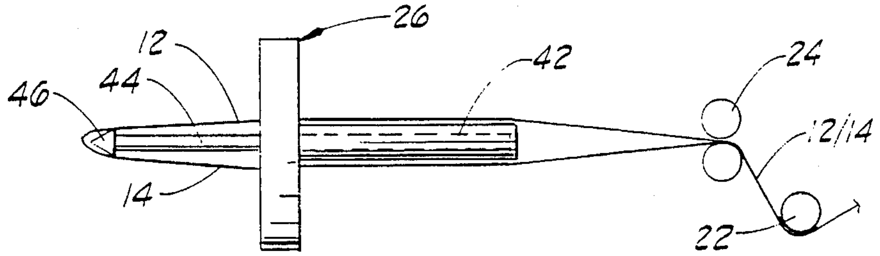
Figure 5M:
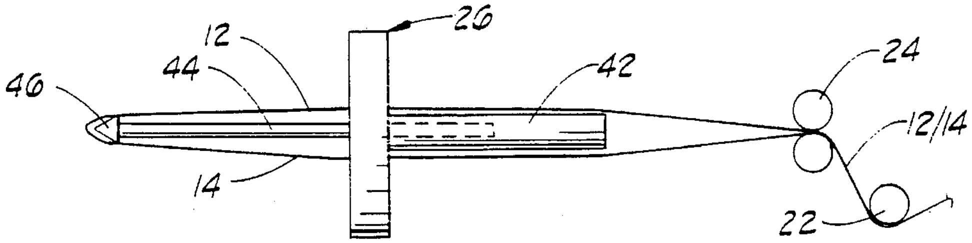
Figure 5N:
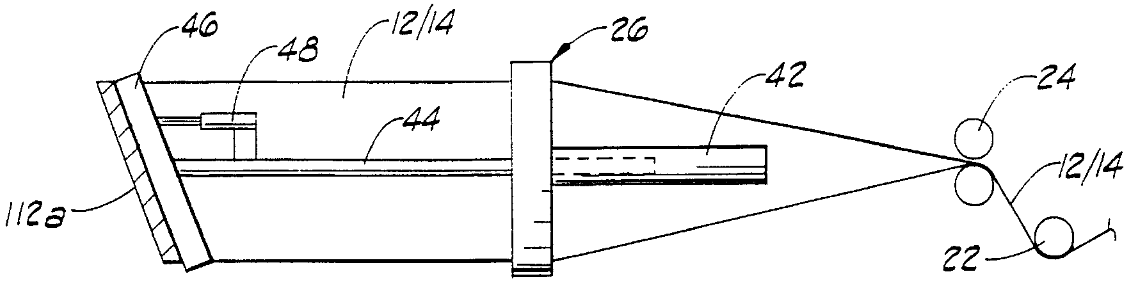

The sequence of operation of the apparatus 10 is schematically illustrated in FIGS. 5A–5N. Although the sequence is repeated over and over again during a sleeve forming operation, it will be assumed, for purposes of description, that the sequence starts with the apparatus in the position shown in FIG. 5A. In this position, it will be assumed that the free ends of the webs 12 and 14 are sealed together as indicated by reference character 100, with the line of the seal 100 extending at an acute angle across the webs to form one side of a sleeve, as will be made clear below. At this stage of the operation, the feed blade 46 is extended at an angle with respect to the plunger rod 44 corresponding to the angle of the line of the seal 100.

From the position shown in FIG. 5A, the feed blade 46 is retracted by movement of the plunger rod 44 toward the rotator assembly 26 as illustrated in FIG. 5B. The cylinder assembly 46 is then operated as indicated by the arrows in FIG. 5B to move the feed blade 46 at an acute angle across the webs 12 and 14, but at an angle opposite to the angle of the line of the seal 100. This position is shown in FIG. 5C, where it will be noted that the feed blade 46 is between the suction cups 92 and the rotator assembly 26. It may be also be noted in FIGS. 5B and 5C that the various suction cups 56, 58 and 92 are shown in phantom for clarity of illustration. The same is true in the remaining figures where the vacuum cups are shown in a side view of the apparatus.

The hot seal and cut bar 90 is then moved into engagement with both of the webs 12 and 14 as shown in FIG. 5D. It will be noted that the bar 90 extends at an acute angle across the webs 12 and 14 parallel with the then position of the feed blade 46; that is, at an acute angle opposite to the acute angle of the line of the seal 100. Upon operation of the bar 90, a new seal 102 is placed across the webs 12 and 14 and the webs are severed at the seal 102 as illustrated in FIG. 5E. At the same time, or prior thereto, vacuum is applied to the suction cups 56 and 58 to expand the resulting sleeve 104, one half of which is shown in FIG. 5E. Then, the sleeve 104 has its larger opening up and a smaller opening down, ready for reception of a potted plant as indicated by the arrow 106 in FIG. 5E.

Then, the rotator assembly 26 is turned ninety degrees, such as clockwise when viewed from the right-hand side of the rotator assembly 26 as shown in FIG. 5E, as indicated by the arrow 108. The rotator assembly is then positioned as shown in side view in FIG. 5F, and the webs 12 and 14 are untwisted. In this position, it will be noted that the feed blade 46 engages a seal **102*a* which formed as a part of the seal 102 and extending at the same acute angle across the webs 12 and 14 as the seal 102**.

The plunger rod 44 is then extended as indicated in FIG. 5G to move the webs 12 and 14 in an untwisted condition to the end of the stroke of the plunger rod 44; whereupon the rotator assembly 26 is rotated ninety degrees in a clockwise direction as indicated by arrow 110 in FIG. 5H which inverts the feed blade 46 and the seal **102*a* from the position shown in FIG. 5E and twists the webs 12 and 14**.

The plunger rod 44 is then actuated (retracted into the cylinder 42) to position the feed blade 46 as shown in FIG. 5I, with the feed blade 46 still at the same acute angle across the webs 12 and 14 as the seal **102*a*. Then, the control cylinder assembly 48 is operated to tilt the feed blade 46 into the position shown in FIG. 5J which is at an acute angle across the webs 12 and 14 opposite to the disposition of the seal 102*a*. Then, the hot seal and cut bar 90 is placed in engagement with the webs 12 and 14 parallel with the then position of the feed blade 46 to form a new seal 112 across the webs 12 and 14 at an acute angle which is opposed to the acute angle of the opposite seal 102*a*. This forms a new sleeve 114 with its upper end extending upwardly and its lower end extending downwardly in the same direction as the previously formed sleeve 104 shown in FIG. 5E. Also, vacuum can be imposed on the suction cups 56 and 58 to expand the sleeve 114** for reception of a potted plant.

The rotator assembly 26 is then rotated counterclockwise ninety degrees as indicated by the arrow 116 which untwists the webs 12 and 14 into the position shown in the side view of FIG. 5L.

Figure 5:
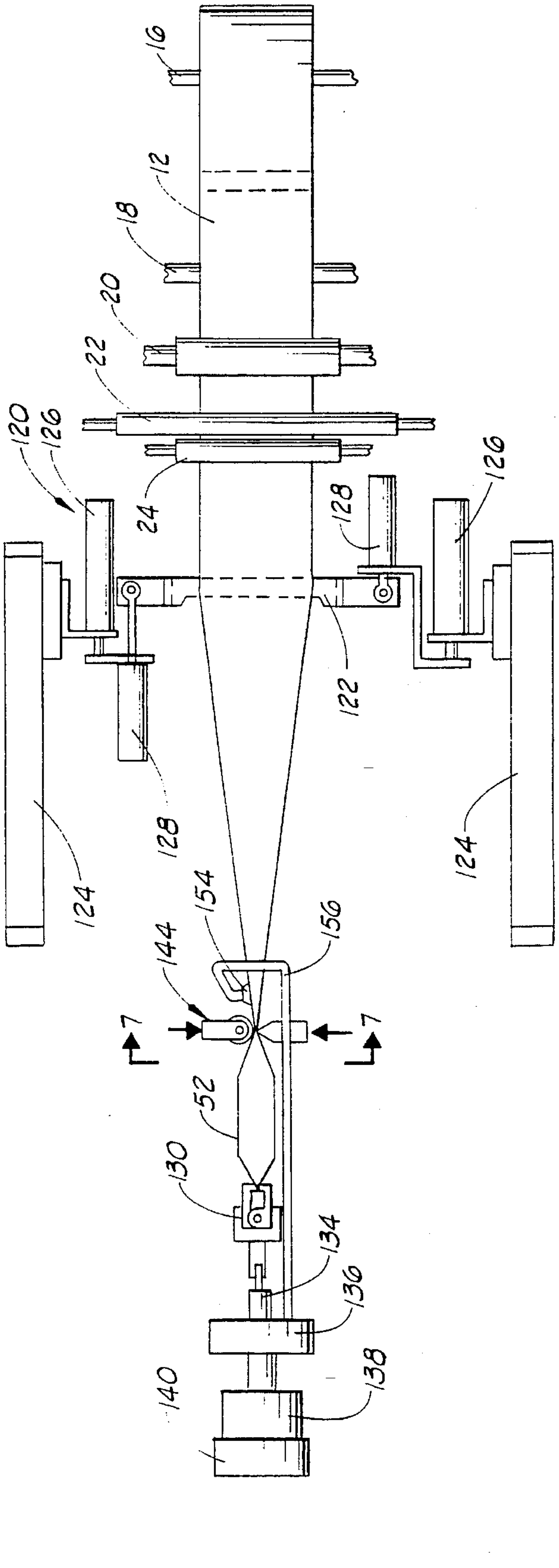

Then the plunger rod 44 is extended further from the cylinder 42 to move the webs 12 and 14 into the position shown in FIG. 5M and the rotator 26 is again turned ninety degrees counterclockwise to position the seal **112*a* in the same relative position (FIG. 5N) as the seal 100 shown at the start of the operation in FIG. 5**A; whereupon the cycle is repeated.

From the foregoing it will be apparent that by twisting the webs 12 and 14 from a neutral position first in one direction and then the other direction places the finished sleeves in the same orientation; that is, if desired, with the large opening of each sleeve facing upwardly and the lower end of each sleeve facing downwardly. With this arrangement, automation of the feeding of the potted plants into the sleeves is greatly facilitated.

EMBODIMENT OF FIGS. 6 AND 7

Figure 7:
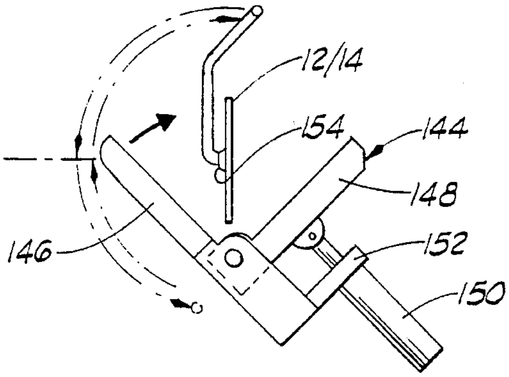
FIG. 7 is a schematic cross-sectional view taken along line 7—7 of FIG. 6A.
Figure 6:
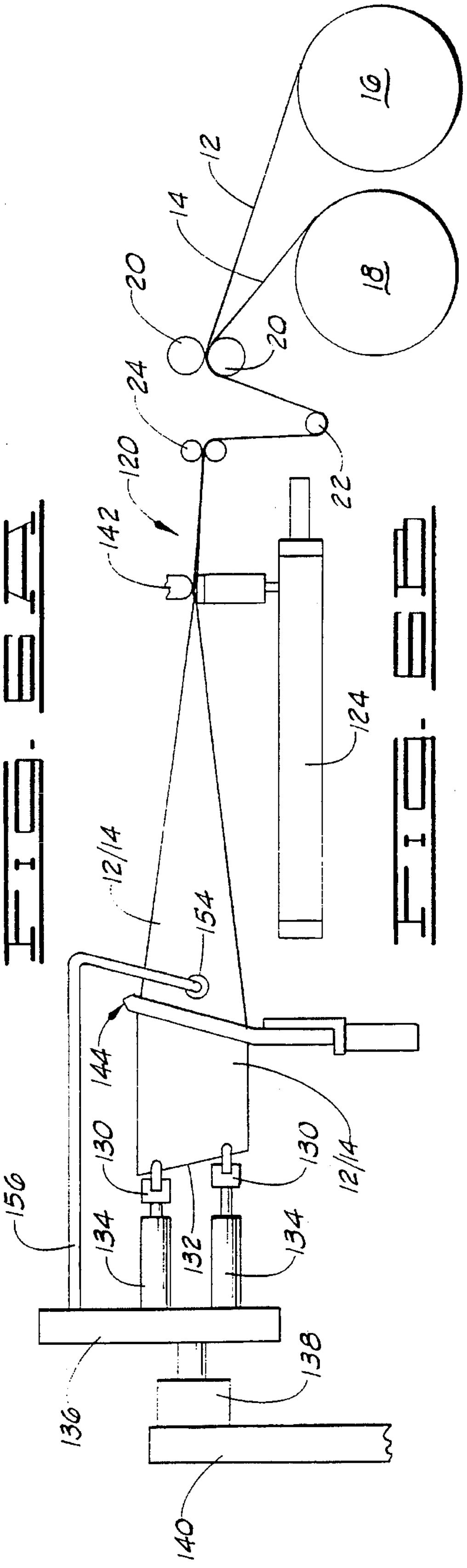
FIG. 6A is a schematic top view of a modified apparatus.
FIG. 6B is a schematic side view of the structure shown in FIG. 6A.

The modified apparatus generally designated at 120 and shown in FIGS. 6A, 6B and 7 receives the overlapping webs 12 and 14 from the same supply arrangement as did the apparatus 10 previously shown and described. In the apparatus 120, the feed blade 122 is moved between the overlapping webs by a cylinder arrangement shown in FIG. 6A. In this embodiment, the feed blade 122 is used solely to advance the webs 12 and 14 and is not used to twist the webs as in the previous embodiment.

The feed blade 122 is supported by three interconnected cylinders 124, 126 and 128 at each side of the apparatus. The cylinders 124 are used to move the feed blade 122 from its retracted position into engagement with a seal at the free ends of the webs 12 and 14 after a sleeve has been formed, comparable to the position of the feed blade 46 shown in FIG. 5E to minimize the possibility of damage to a seal. The cylinders 126 are then used to advance the feed blade 122 to move the webs 12 and 14 to their most extended position, comparable to the position shown in FIG. 5A. The cylinders 128 are used to vary the angular position of the feed blade 122 across the webs between the two acute angle positions similar to the position shown in FIGS. 5A and 5C.

Rather than using a rotator assembly 26 as previously described, this embodiment utilizes a pair of grippers 130 for gripping the free ends 132 of the webs 12 and 14. Each gripper 130 is connected to a cylinder 134 extending from a bar 136. The bar 136 is then connected to a rotary actuator 138 suitably mounted on the frame 140 of the apparatus. With this arrangement, the grippers 130 can be positioned in the desired positions to grip the free ends 132 of the webs 12 and 14 and upon actuation of the rotary actuator 138 through a rotation of ninety degrees, the webs 12 and 14 will be twisted in a manner similar to the twisting accomplished with the rotator assembly 26 previously described. In this embodiment, clamping bars or rollers 142 are positioned adjacent the feed blade 122 to grip the webs 12 and 14 during a twisting action. The bars or rollers 142 will be spaced apart for actuation of the feed blade 122 when that mechanism is utilized.

The hot seal and cut bar assembly 144 of this embodiment is arranged with the respective bars 146 and 148 pinned together as shown in FIG. 7, with an actuating cylinder 150 pinned to the bar 148 and anchored by a stationary bracket 152. With this arrangement, the bars 146 and 148 of the hot seal and cut assembly, are scissored together into engagement with the webs 12 and 14 for the sealing and cutting operation in the manner previously described. This embodiment will also use a sleeve opener assembly similar to the sleeve opener assembly 50 previously described.

A vacuum cup 154 is positioned to engage one of the webs 12 or 14 after a sleeve has been made. The vacuum cup 154 is on the end of an arm 156 extending from the gripper rotating bar 136. With this arrangement, the vacuum cup 154 untwists the webs 12 and 14 after a sleeve is formed, to put the webs 12 and 14 in the proper position for engagement by the feed blade 122 for the next cycle of operation.

The sequence of operation utilizing the embodiment shown in FIGS. 6A, 6B and 7 is very comparable to the sequence of operation previously described. The webs are twisted from a neutral position in one direction ninety degrees for forming one seal for one side of a sleeve and twisted ninety degrees in the opposite direction from a neutral position to form the seal at the opposite side of a sleeve.

Changes may be made in the combination and arrangement of parts or elements or steps or procedures without departing from the spirit and scope of the invention as defined in the following claims.

What is claimed is:

1. In a method of forming sleeves from overlapping webs wherein the webs are sealed together and severed along lines extending at acute angles across the webs with adjacent lines extending at opposed angles to form a sleeve between each pair of lines having one end larger than the other end, the improvement comprising:

twisting the webs first in one direction, when one seal is made, then in the opposite direction when a next seal is made, whereby all of the sleeves are oriented in the same direction when produced.

2. The method defined in claim 1 characterized further to include the step of opening each sleeve as the sleeve is formed.

3. The method defined in claim 1 wherein the webs are twisted using a feed blade between the webs.

4. The method of claim 1 wherein the webs are twisted using grippers engaging the sealed ends of the webs.

5. A method of forming sleeves from overlapping webs, comprising the steps of:

extending the webs from a source of supply with the free ends of the webs sealed together at a first acute angle across the webs;

twisting the webs in one direction ninety degrees;

sealing and severing the webs along a line extending at a second acute angle across the webs a distance from the free ends of the webs, with said second acute angle being opposed to said first acute angle to form a sleeve between said seals having one end larger than the other end, and leaving the free ends of the webs sealed along said second acute angle;

untwisting the webs;

again extending the webs from the source of supply;

twisting the webs ninety degrees in the opposite direction; and sealing and severing the webs along a line extending at said second acute angle across the webs a distance from the free ends of the webs to form a sleeve between said last mentioned two seals having one end larger than the other end and extending in the same direction as the first sleeve formed and leaving the free ends of the webs sealed along said second acute angle.

* * * * *

UNITED STATES PATENT AND TRADEMARK OFFICE
CERTIFICATE OF CORRECTION

PATENT NO. : 5,492,588

DATED : February 20, 1996

INVENTOR(S) : Weder et al.

It is certified that error appears in the above-identified patent and that said Letters Patent is hereby corrected as shown below:

Column 1, line 58, after 'of', please insert --the--.

Column 2, line 60, delete "50", and substitute therefor --54--.

Column 4, line 1, delete "46", and substitute therefor --48--.

Signed and Sealed this

Ninth Day of July, 1996

Attest:

Bruce Lehman

BRUCE LEHMAN

*Attesting Officer*

*Commissioner of Patents and Trademarks*